US011580320B2

(12) United States Patent
Upadhyay et al.

(10) Patent No.: US 11,580,320 B2
(45) Date of Patent: Feb. 14, 2023

(54) ALGORITHM FOR SCORING PARTIAL MATCHES BETWEEN WORDS

(71) Applicant: PAYPAL, INC., San Jose, CA (US)

(72) Inventors: Rushik Upadhyay, Milpitas, CA (US); Dhamodharan Lakshmipathy, San Jose, CA (US); Nandhini Ramesh, San Jose, CA (US); Aditya Kaulagi, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 44 days.

(21) Appl. No.: 17/186,998

(22) Filed: Feb. 26, 2021

(65) Prior Publication Data

US 2021/0232852 A1 Jul. 29, 2021

Related U.S. Application Data

(63) Continuation of application No. 16/234,855, filed on Dec. 28, 2018, now Pat. No. 10,943,143.

(51) Int. Cl.
*G06K 9/00* (2022.01)
*G06K 9/62* (2022.01)
(Continued)

(52) U.S. Cl.
CPC ......... *G06K 9/6215* (2013.01); *G06F 40/216* (2020.01); *G06F 40/289* (2020.01)

(58) Field of Classification Search
CPC ....... G10L 15/26; G10L 15/187; G10L 13/00; G10L 15/08; G10L 13/08; G10L 15/00;
(Continued)

(56) References Cited

U.S. PATENT DOCUMENTS 637,421 A   11/1899  Schmidt et al.
4,718,094 A * 1/1988  Bahl ...................... G10L 15/08
                                                    704/251
(Continued)

FOREIGN PATENT DOCUMENTS

WO   WO 2008/109769   9/2008

OTHER PUBLICATIONS

International Application No. PCT/US2019/069012, International Preliminary Report on Patentability dated Jul. 8, 2021, 13 pages.
(Continued)

*Primary Examiner* — Shervin K Nakhjavan
(74) *Attorney, Agent, or Firm* — Haynes and Boone, LLP

(57) ABSTRACT

Techniques are disclosed relating to scoring partial matches between words. In certain embodiments, a method may include receiving a request to determine a similarity between an input text data and a stored text data. The method also includes determining, based on comparing one or more words included in the input text data with one or more words included in the stored text data, a set of word pairs and a set of unpaired words. Further, in response to determining that the set of unpaired words passes elimination criteria, the method includes calculating a base similarity score between the input text data and the stored text data based on the set of word pairs. The method also includes determining a scoring penalty based on the set of unpaired words and generating a final similarity score between the input text data and the stored text data by modifying the base similarity score based on the scoring penalty.

20 Claims, 6 Drawing Sheets

(51) Int. Cl.
*G06F 40/216* (2020.01)
*G06F 40/289* (2020.01)

(58) Field of Classification Search
CPC ............... G10L 15/1815; G10L 15/19; G10L 2015/086; G06F 40/242; G06F 40/58; G06F 40/253; G06F 16/24522; G06F 16/433; G06K 9/18; G06K 9/344; G06K 2209/01; G06K 9/6215; G06K 9/72
See application file for complete search history.

(56) References Cited

U.S. PATENT DOCUMENTS

| | | | | |
|---|---|---|---|---|
| 4,833,610 A * | 5/1989 | Zamora | ............... | G06F 16/3343 |
| | | | | 707/999.005 |
| 4,896,358 A * | 1/1990 | Bahler | ............... | G10L 25/00 |
| | | | | 704/240 |
| 5,689,585 A * | 11/1997 | Bloomberg | ............... | G06V 30/416 |
| | | | | 382/229 |
| 6,067,520 A * | 5/2000 | Lee | ............... | G10L 15/144 |
| | | | | 704/231 |
| 6,137,911 A * | 10/2000 | Zhilyaev | ............... | G06K 9/62 |
| | | | | 382/229 |
| 6,216,102 B1 | 4/2001 | Martino et al. | | |
| 6,286,000 B1 * | 9/2001 | Apte | ............... | G06F 16/319 |
| | | | | 707/999.005 |
| 6,374,210 B1 * | 4/2002 | Chu | ............... | G06F 40/53 |
| | | | | 704/9 |
| 6,411,932 B1 * | 6/2002 | Molnar | ............... | G10L 13/00 |
| | | | | 704/254 |
| 7,453,439 B1 | 11/2008 | Kushler et al. | | |
| 7,599,930 B1 * | 10/2009 | Burns | ............... | G06F 16/3338 |
| | | | | 707/999.102 |
| 7,814,107 B1 | 10/2010 | Thirumalai et al. | | |
| 8,095,546 B1 * | 1/2012 | Baluja | ............... | G06V 30/416 |
| | | | | 707/750 |
| 8,510,314 B1 * | 8/2013 | Baluja | ............... | G06F 16/9024 |
| | | | | 707/750 |
| 10,095,692 B2 * | 10/2018 | Song | ............... | G06F 40/56 |
| 10,534,827 B2 * | 1/2020 | Spears | ............... | G06F 40/10 |
| 11,269,935 B2 * | 3/2022 | Upadhyay | ............... | G06F 16/9535 |
| 2005/0065909 A1 * | 3/2005 | Musgrove | ............... | G06Q 30/0603 |
| 2006/0200338 A1 * | 9/2006 | Cipollone | ............... | G06F 40/242 |
| | | | | 704/4 |
| 2007/0040813 A1 * | 2/2007 | Kushler | ............... | G06F 3/0237 |
| | | | | 345/173 |
| 2007/0150279 A1 | 6/2007 | Gandhi et al. | | |
| 2007/0282827 A1 | 12/2007 | Levin | | |
| 2008/0109769 A1 | 5/2008 | Baumgartner et al. | | |
| 2008/0221866 A1 | 9/2008 | Katragadda et al. | | |
| 2011/0106792 A1 * | 5/2011 | Robertson | ............... | G10L 15/26 |
| | | | | 707/723 |
| 2014/0156261 A1 | 6/2014 | Patman Maguire | | |
| 2016/0078037 A1 * | 3/2016 | Ziezold | ............... | G06F 16/29 |
| | | | | 707/728 |
| 2016/0299886 A1 | 10/2016 | Patman Maguire | | |
| 2018/0046611 A1 * | 2/2018 | Khatri | ............... | G06F 40/284 |

OTHER PUBLICATIONS

International Application No. PCT/US2019/069012, International Search Report and Written Opinion dated Mar. 31, 2020, 14 pages.
International Appl No. PCT/US2019/69012, International Search Report and Written Opinion dated Mar. 31, 2020, 30 pages.

* cited by examiner

ALGORITHM FOR SCORING PARTIAL MATCHES BETWEEN WORDS

CROSS REFERENCE TO RELATED APPLICATION

This application is a continuation of U.S. application Ser. No. 16/234,855, filed Dec. 28, 2018, which is incorporated herein by reference in its entirety.

BACKGROUND

Technical Field

This disclosure relates generally to matching textual information and, more specifically, to implementing an algorithm for scoring partial matches between words.

Description of the Related Art

The ability to match textual information is a frequent endeavor among various computer systems today. For instance, Internet search algorithms attempt to match input text from a user with webpages that contain similar text to the input text. Numerous other contexts also exist in which a system attempts to match an input text data with stored text data. However, in cases where the input text data only partially matches the stored text data typical matching algorithms may over penalize these partial matches and fail to identify matches.

Figure 1:
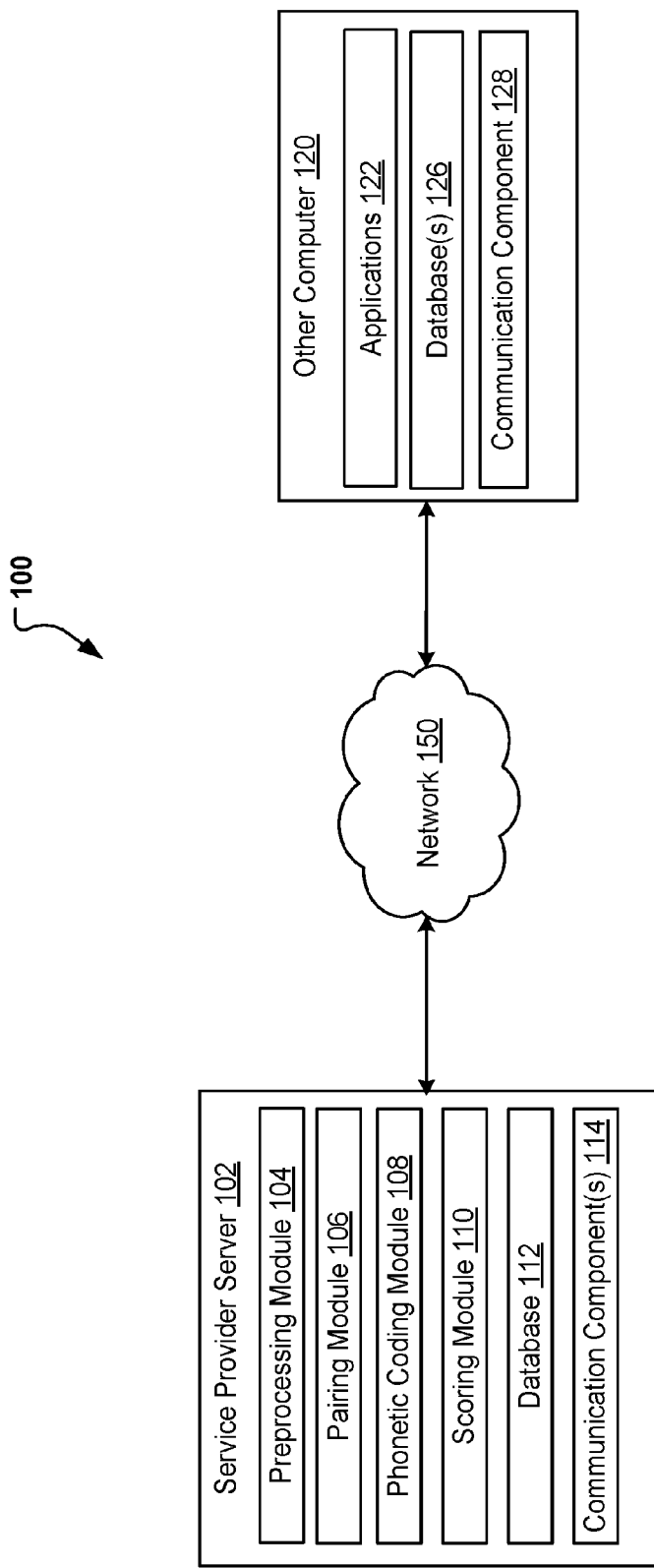
FIG. 1 is a block diagram illustrating an example system for scoring partial matches between words, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "alignment module configured to perform a sequence alignment algorithm" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As used herein, the term "edit distance" between two words refers to the minimum number of operations needed to transform one of the two words into the other word of the two words.

As used herein, the term "text data" may refer to any type of data corresponding to textual information, such as strings and/or the like.

DETAILED DESCRIPTION

Techniques are disclosed for an algorithm for scoring partial matches between words. In certain embodiments, a service provider server may be configured to receive instructions to search stored text data to identify a match for input text data. As such, the techniques described herein can be applied to various contexts. For example, the search may be a web search, and the input text data may correspond to one or more search terms. The stored text data may correspond to text data of one or more web pages that are to be searched with respect to the search terms. In another example, the stored text data may be included in an electronic file, such as an index file, and may store a set of entity names. Additionally, the input text may correspond to names of one or more parties participating in a digital transaction being processed by the service provider server. As such, the index file may be searched to identify an entity name that is match for the input text. It will be appreciated that numerous other contexts in which input text data is searched against stored text data are also possible.

According to a particular embodiment, in order to perform the search, the service provider server is configured to determine a similarity score between a first set of words included in the input text data and a second set of words included in the stored text data. To this end, the service provider server may be configured to compare the first set of words with the second set of words to identify a set of word pairs and a set of unpaired words. Each word pair from the set of word pairs includes a word from the first set of words and a word from the second set of words. Each word from the set of unpaired words is either a word from the first set of words that could not be paired with any word from the second set of words, or is a word from the second set of words that could not be paired with any word from the first set of words.

For instance, consider the scenario in which the first set of words corresponds to the entity name "Abdel Mohammed" and the second set of words corresponds to the entity name "Abdul Mohammad Khan." The service provider, based on a pairing algorithm that is discussed more extensively below, may identify "Abdel" and "Abdul" as a first word pair, "Mohammed" and "Mohammad" as a second word pair, and "Khan" as an unpaired word. Subsequently, the service provider server may analyze the set of word pairs and the set of unpaired words to determine whether elimination criteria have been passed. Further, the pairing algorithm may determine respective edit distances associated with each word pair of the set of word pairs.

If the elimination criteria is not passed, the service provider server determines that the first set of words is not a match with the second set of words (e.g., the similarity score between the first set of words and the second set of words is 0). If the service provider server determines that the elimination criteria is passed, the service provider server calculates a base similarity score between the first set of words and the second set of words. The service provider server may calculate the base similarity score based on the respective edit distances associated with each word pair of the set of word pairs.

Further, the service provider server may normalize the base similarity score based on a first average word length of each word in each word pair and a second average word length of all of the words included in the first set of words and the second set of words. According to certain embodiments, normalizing the base score may increase the base similarity score if the first average word length is greater than the second average word length. Conversely, normalizing the base similarity score may decrease the base score if the first average word length is less than the second average word length.

In addition, the service provider server may calculate any penalties to be applied to the normalized base score based on certain attributes of the set of word pairs and the set of unpaired words. For example, the service provider server may calculate a base penalty based on a number of word pairs that are included in the set of word pairs. The base penalty is inversely proportional to the number of word pairs (i.e., the base penalty decreases as the number of word pairs increases).

Further, the service provider server may determine whether the set of unpaired words includes at least one word from the first set of words and at least one word from the second set of words. If so, the service provider server may modify the base penalty by a first predetermined weight. If the set of unpaired words does not include words from both the first set of words and the second set of words, the service provider server may not modify the base penalty, or in other embodiments, the service provider server may modify the base penalty by a second predetermined weight that is less than the first predetermined weight.

A respective base penalty (which may or may not have been previously modified by the first predetermined weight or the second predetermined weight) may be generated for each word in the set of unpaired words. In some embodiments, the service provider server may also determine a corresponding coefficient to apply to each respective base penalty. Each corresponding coefficient may be different from each other and may change depending on the number of words included in the set of unpaired words. The service provider server adjusts each respective based penalty by its corresponding coefficient.

The service provider server modifies the normalized base similarity score by the sum of the respective adjusted base penalties. For instance, each respective adjusted base penalty is subtracted from the normalized base similarity score. The resulting similarity score is designated by the service provider server as the final similarity score between the first set of words and the second set of words.

It is noted that typical scoring algorithms may over penalize a similarity score between two sets of words that are only partially matched. Two sets of words are partially matched if a word from one of the sets of words cannot be paired with a word from the other set of words. As such, partial matches occur when one of the sets of words does not include the same number of words as the other set of words. For instance, using the example previously discussed, "Abdel Mohammed" and "Abdul Mohammad Khan" are partially matched because the word "Khan" is unpaired. Furthermore, partial matches can also occur when both sets of words include a respective unpaired word. For example, "blue car" and "red car" are partially matched because both "blue" and "red" are unpaired words.

In certain embodiments, the techniques described herein reduces the penalty typically associated with such partial matches in traditional scoring algorithms. In particular, traditional scoring algorithms may fail to identify potential matches between input text data and stored text data. For example, a traditional scoring algorithm may be based primarily on an edit distance between two words and may determine a score between "Abdel Mohammed" and "Abdul Mohammad Khan" that is significantly lower than a score produced by the scoring algorithm described in the present disclosure. As a result, the traditional scoring algorithm may fail to identify the above two names as much even though it could likely that they are the same person.

FIG. 1 is a block diagram illustrating an example system 100 for scoring partial matches between words. In the illustrated embodiment, the system 100 includes a service provider server 102 of a service provider in communication with other computer 120 via a network 150. The service provider server 102 may be configured to score partial matches between words in various contexts.

For example, the algorithm for scoring partial matches between words may be used as part of a general search algorithm. The service provider server 102 may receive an input text data (e.g., a search term) and compare the input text with stored text data. As such, the service provider server 102 may determine if any of the text in the stored text data matches the input text data. In one embodiment, the search algorithm corresponds to an Internet search, and the input text data is provided by the other computer 120. The service provider 102 performs the algorithm for scoring partial matches to identify any webpages that include text data that matches the input text data. More particularly, the service provider 102 may determine whether a similarity score between the text data of the webpages and the input text data satisfies a score threshold. A match is identified if the score threshold is satisfied.

In another embodiment, the service provider server 102 analyzes payment transactions of a payment service to determine whether any users of the payment service (e.g., payors, payees, customers, merchants, etc.) is a bad actor. Bad actors may be individuals and/or organizations that are known to perpetrate fraud, terrorism, and/or other criminal or undesirable activities. To this end, the service provider server 102 may receive or may be configured to access an index file that stores a set of entity names. The entity names correspond to entities that are known to be bad actors (e.g., entities that are included on a blacklist provided by a government agency or other party). The service provider server 102 may monitor payment transactions of the payment service to determine whether any users of the payment service and/or parties to the payment transactions are included in the blacklist. For instance, for certain payment transactions, the service provider server 120 may perform algorithm for scoring partial matches with respect to the users associated with the payment transactions and the blacklist. Based on the algorithm for scoring partial matches, if the service provider server 102 determines one or more of the users are included in the blacklist, the service provider server 102 may decline the payment transaction, flag the identified user(s) and the payment transaction for law enforcement, and/or take other remedial action. For instance, the service provider 102 may, for each name associated with a user, determine whether a similarity score between the name and any of the names included in the blacklist satisfies a score threshold. A match is identified if the score threshold is satisfied.

It will be appreciated that the above examples are for illustrative purposes and that the algorithm for scoring partial matches can be implemented in various other contexts. Further, the index file may be stored on the service provider server 102 and/or any other third-party computer or database, such as other computer 120.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, the service provider server 102 may include a preprocessing module 104, a pairing module 106, a phonetic coding module 108, a scoring module 110, a database 112, and communication components 114. Each components of the service provider 102 may communicate with each other to implement the ability to perform the algorithm for scoring partial matches, as will be describe in more detail below. Portion of FIG. 1 are described in conjunction with FIG. 2, which illustrates a data flow diagram for implementing the algorithm for scoring partial matches.

The preprocessing module 104 may be configured to preprocess the stored text data before performing the algorithm for scoring partial matches with respect to the input text data and the stored text data. As previously discussed, the stored text data may be an index file, such as index file 202 shown in FIG. 2, that stores multiple entries, though it will be appreciated that the stored text data can be stored in other types of data structures. As used herein, an "entry" of the index file 202 may be a unit of search for the index file 202. Each entry of the index file 202 may include one or more words, and in some embodiments, each of the one or more words may correspond to a respective entity name. As shown in data flow 206, the index file 202 is provided to the preprocessing module 104 or is otherwise made accessible to the preprocessing module 104. The index file 202 may be stored locally by the service provider server 102 and/or may be stored at an external source.

As such, the preprocessing module 104 may be configured to identify common words and uncommon words included in the entity names stored in the index file 202. In some implementations, the preprocessing module 104 may access a separate common words file that stores a list of common words. As such, the preprocessing module 104 may analyze each word in the index file 202 determine whether there is a matching word in the list of common words. Based on the analysis, the preprocessing module 104 may tag and/or otherwise indicate the words that are identified as common. For example, words that relate to business entities (e.g., Corporation, Limited, Inc., Incorporated, Bank) may be identified by the preprocessing module 106 as common words. After preprocessing the index file 202, the preprocessing module 104 provides and/or makes accessible the index file 202 to the pairing module 106, as shown in data flow 208.

The pairing module 106 may be configured to determine whether any words from a first set of words can be paired with respective words from a second set of words. For example, the pairing module 106 may be configured to perform this task with respective to the input text data 204 (provided to the pairing module 106 at data flow 210) and one or more entries of the index file 202. In certain implementations, the pairing module 106 is configured to perform this determination between the input text data 204 and an entry of the index file 202. This determination may be further repeated between the input text data 204 and one or more entries of the remaining entries of the index file 204.

To this end, the pairing module 106 is configured to compare each word of the first set of words with each word of the second set of words. These comparison are hereinafter referred to as pairing comparisons. Based on these pairing comparisons, the pairing module 106 determines a set of word pairs in which each word pair includes a word from the first set of words and a second word from the second set of pairs. Additionally, the pairing module 106 also determines a set of unpaired words based on the pairing comparisons. A particular word included in the set of unpaired words may be a word from the first set of words that the pairing module 106 is unable to pair with any word from the second set of words. Alternatively, the particular word may be a word from the second set of words that the pairing module 106 is unable to pair with any word from the first set of words.

In order to perform the pairing comparisons, the pairing module 106 is configured to provide (e.g., at data flow 212) the first set of words and the second set of words to the phonetic coding module 108. The phonetic coding module 108 is configured to generate respective phonetic codes corresponding to each word in the first set of words and each word in the second set of words. The phonetic codes are generated according to a phonetic coding algorithm. According to a particular embodiment, the phonetic coding algorithm is based on the Soundex system. As shown in data flow 214 of FIG. 2, the phonetic coding module 108 provides the respective phonetic codes for each word in the first set of words and the second set of words back to the pairing module 106.

In an example instance of performing the pairing comparisons, the pairing module 106 compares a first word from the first set of words with a second word from the second set of words. To this end, the pairing module 106 may first determine a distance score between the first word and the second word. The distance score is calculated base on an edit distance (e.g., the Leveshtein distance) between the first word and the second word. In certain embodiments, the distance score between two words is given by Equation 1 as follows:

$$\text{Distance\_Score} = (1 - (\text{Edit\_Distance}/\text{Max\_length})) * 100 \quad \text{Equation 1:}$$

The Max_length variable represents the greater word length (in characters) between the two words. Additionally, a greater Distance_Score for two words may indicate a closer match for the two words than a lesser Distance_Score.

If the distance score between the first word and the second word satisfies a distance score threshold, the pairing module 106 may identify the first word and the second word as a word pair. Further, the pairing module 106 is configured to compare the respective phonetic codes of the first word and the second word to determine a phonetic distance between the respective phonetic codes. Based on the phonetic distance, the pairing module 106 determines whether to adjust the previously determined edit distance of the (now identified) word pair of the first word and the second word.

If the distance score between the first word and the second word fails to satisfy the distance score threshold (and in some implementations, also fails to satisfy additional pairing criteria), then the pairing module 106 determines that the first word and the second word are not word pairs. The process for comparing the first word and the second word is repeated for remaining combinations of words from the first set of words and words from the second set of words. Any word from either the first set of words or the second set of words that is unable to be paired by the pairing module 106 is identified as an unpaired word. Thus, at the end of performing the pairing comparisons, the pairing module 106 determines the set of word pairs and the set of unpaired words. The pairing comparisons are described in further detail below in the description of FIG. 4.

Figure 2:
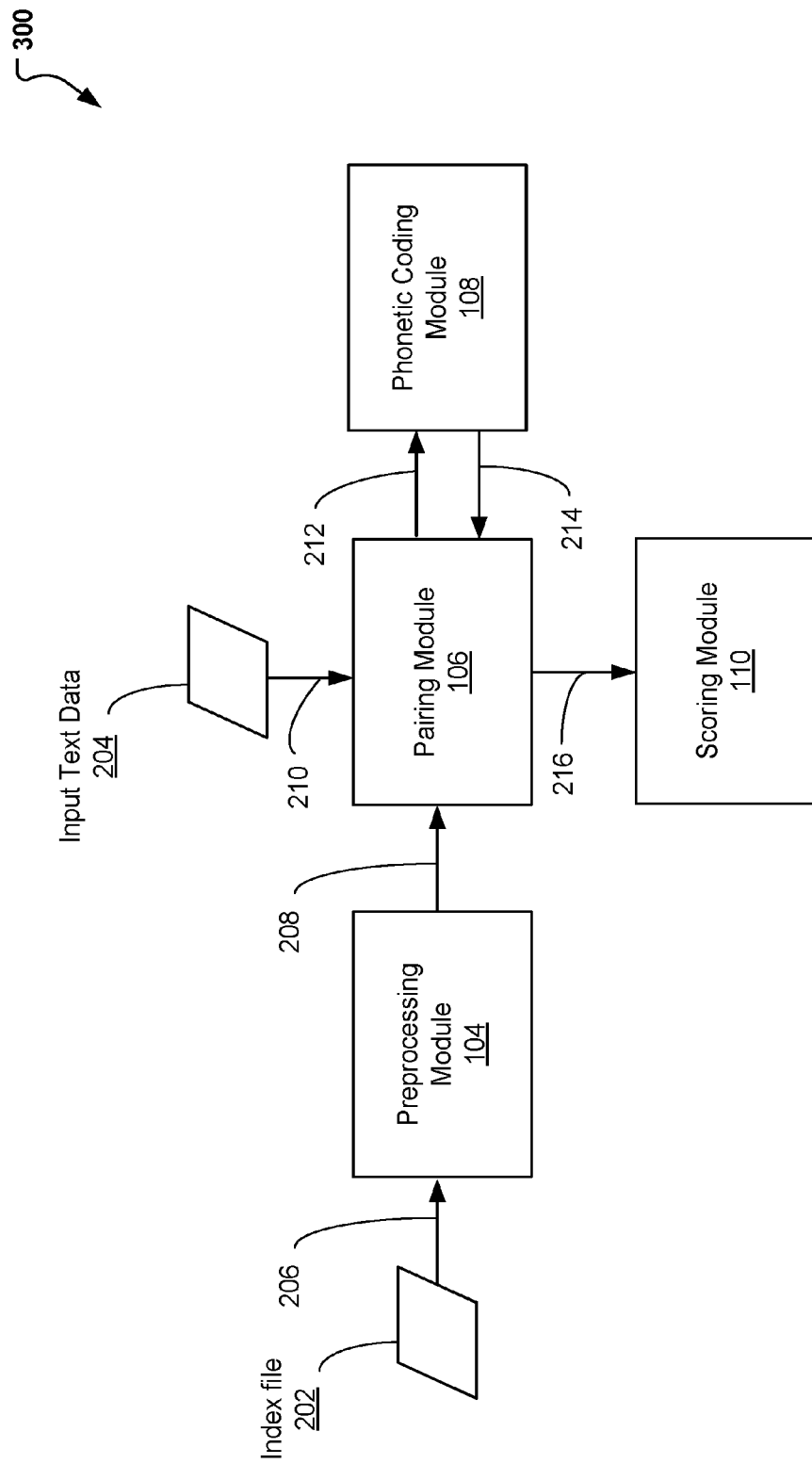
FIG. 2 illustrates a diagram illustrating a data flow for scoring partial matches between words, according to some embodiments.

As shown in data flow 216 of FIG. 2, the set of word pairs and the set of unpaired words are provided to the scoring module 110. The scoring module 110 is configured to determine a final similarity score between the first set of words and the second set of words based on certain attributes of the set of word pairs and the set of unpaired words. The scoring module 110 compares the final similarity score with a similarity score threshold. If the final similarity score satisfies the similarity score threshold, a match between the first set of words and the second set of words is identified (e.g., a match between the input text data 204 and an entry of the index file 202).

In calculating the final similarity score, the scoring module 110 may first calculate a base score based on the set of word pairs. For example, the base score may be calculated using the respective edit distance (previously determined by the pairing module 106) for each word pair. According to a particular embodiment, the base score is calculated using Equation 1, where the Edit_Distance is the sum of the respective edit distances for each word pair. As such, the set of unpaired words is not factored into calculating the base score.

Upon determining the base score, the scoring module 110 may be configured to normalize the base score. As such, the scoring module 110 determines a first average word length of the words in the set of word pairs. The scoring module 110 also determines a second average word length of all the words in the first set of words and the second set of words (i.e., all words in the set of word pairs and the set of unpaired words). The base score is normalized based on the first average word length and the second average word length, and in some embodiments, is given by Equation 2 and Equation 3, as follows:

$$\text{adjustment} = ((\text{avgLength}_{paired}/\text{avgLength}_{all}) * 10) - 10 \quad \text{Equation 2:}$$

$$\text{Norm\_Base\_Score} = \min(100, \text{Base\_Score} + \text{adjustment}). \quad \text{Equation 3:}$$

In some implementations, the adjustment is limited to the range between −3 and 3, and if the equation outputs a number outside of this range, the adjustment is set to either −3 or 3, whichever is closer to the output.

The scoring module 110 is also configured to determine one or more penalties to be applied to the normalized base score. To this end, the scoring module 110 calculates respective penalties corresponding to each unpaired word in the set of unpaired words. In order to calculate the respective penalties, the scoring module 110 first calculates a base penalty based on a number of word pairs included in the set of word pairs. In some embodiments, the base penalty is calculated using Equation 4, as follows:

$$\text{Base\_Penalty} = (\text{Norm\_Base\_Score} - \text{Sim\_Score\_Threshold})/(\text{\# of word pairs}) \quad \text{Equation 4:}$$

In the above equation, the Sim_Score_Threshold represents the similarity score threshold that the scoring module 110 will eventually compare the final similarity score against to determine whether the first set of words matches the second set of words. Further, as shown above, the base penalty decreases as the number of word pairs in the set of word pairs increases.

According to certain embodiments, the scoring module 110 is also configured to determine whether the set of unpaired words includes words from both the first set of words and the second set of words. If so, the scoring module 110 adjusts the base penalty by a predetermined weight (e.g., by a factor of 1.5). Further, for each unpaired word, the scoring module 110 may also determine a respective coefficient to apply to its respective base penalty. The respective coefficients that are applied to each respective base penalty is determined based on the number of unpaired words included in the set of unpaired words. Further, each respective coefficient may differ from each other, and may increase as the number of unpaired words included in the set of unpaired words increases. The respective penalties for each unpaired word are summed to generate the total penalty. The total penalty is subtracted from normalized base score to obtain the final similarity score between the first set of words and the second set of words.

For example, consider a scenario in which the set of unpaired words include a first unpaired word from the first set of words and a second unpaired word from the second set of words. Further, the scoring module 110 calculates the base penalty for each of the unpaired words to be 6. Since the set of unpaired words includes words from both the first and second set of words, the base penalty may be multiplied by a predetermined weight of 1.5. Furthermore, the scoring module 110 may determine, based on the number of two unpaired words included in the set of unpaired words, that the coefficients to apply to the base penalty are 0.75 and 0.82, respectively. Thus, the penalty corresponding to the first unpaired word may be 6.75 (i.e., 6*1.5*0.75), and the penalty corresponding to the second unpaired word may be 7.38 (i.e., 6*1.5*0.82). As a result, the total penalty may be the sum of both penalties which in this example amounts to 14.13.

The database 112 stores various information used to implement the techniques described herein. In certain embodiments, the database 112 may store the index file, similarity scores, pairing information associated with word pairs, and/or the like.

The communication component 114 may be configured to communicate with various other devices, such as the user computer 120 and/or other devices. In various embodiments, communication component 114 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the other computer 120, which includes applications 122, database 126, and communication component 128. According to one or more embodiments, the other computer 120 may provide, via the user application 122, an input text to the service provider server 102. As previously discussed, the input text could be an Internet search term, information included in a payment transaction, and/or any other text data used in a search. In response, the service provider server 102 may be configured perform the algorithm for scoring partial matches using the input text with respect to other textual information, such as textual information included in one or more webpages, lists, blacklists, index files, and/or the like.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 3:
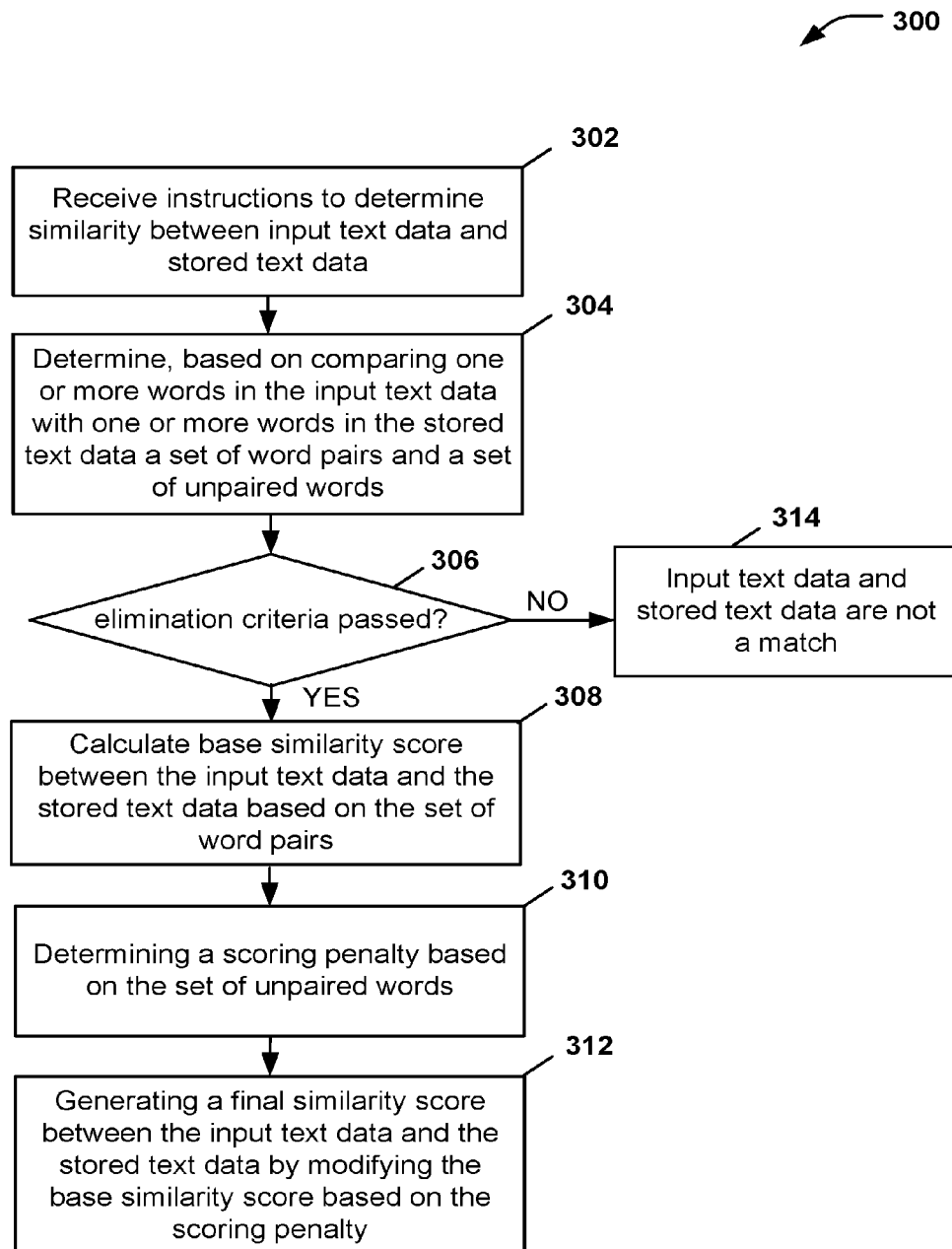
FIG. 3 illustrates a flow diagram illustrating a method for scoring partial matches between words, according to some embodiments.

FIG. 3 illustrates an example flow diagram of a method 300 for scoring partial matches between words, according to some embodiments. The method 300 begins at step 302, where the service provider server 102 receives instructions to determine a similarity between input text data and stored text data. In certain embodiments, the input text data and stored text data each represent a respective set of words that correspond to phrases, entity names, and/or the like. As previously discussed, the preprocessing module 104 may be configured to preprocess the stored text data to identify common words and uncommon words included in the stored text data.

At step 304, the service provider server 102 may determine, based on comparing one or more words in the input text data with one or more words in the stored text data, a set of word pairs and a set of unpaired words. As previously discussed, the pairing module 106 may be configured to identify word pairs based in part on phonetic codes associated with the input text data and the stored text data.

At step 306, the service provider server 102 analyzes the set of word pairs and the set of unpaired words to determine whether certain elimination criteria is passed. If not, the method 300 proceeds to step 314, and the service provider server 102 determines that the input text data and the stored text data are not a match. In some implementations, the scoring module 110 indicates that the input text data and the stored text data are not a match by assigning a final similarity score between the input text data and the stored text data a value of 0.

For instance, the service provider server 102 may compare the number of unpaired words in the set of unpaired words against a number threshold. If the number of unpaired words satisfies the number threshold (e.g., exceeds the number threshold), the service provider server 102 may automatically determine that the input text data is not a match with the stored text data. It will be appreciated that the number threshold can be configured to be any number and may be adjustable by the entity that maintains the service provider server 102.

As another example, the service provider server 102 determines whether all of the word pairs included in the set of word pairs correspond to common words (e.g., as identified by preprocessing module 104.) It is understood that if a word, of a particular word pair, is from the stored text data, and the word is identified as a common word by the preprocessing module 104, then the other word in the particular word pair is also identified as the same common word. The service provider server 102 also determines whether the set of unpaired words includes an uncommon word. If the service provider server 102 determines that all of the word pairs correspond to common words and that the set of unpaired words includes at least one uncommon word, the service provider server 102 automatically determines that the input text data is not a match with the stored text data.

For instance, the input text data may be "Sunshine Corporation Limited" and the stored text data may be "Moon Corporation Limited." The words "Sunshine" and "Moon" may be identified as uncommon words while the words "Corporation" and "Limited" may be identified as common words. The only word pairs formed from the input text data and the stored text data may be "Corporation" and "Limited," which are common words. The unpaired words both correspond to uncommon words. Therefore, the service provider server 102 (e.g., via the scoring module 110) may determine that the input text data is not a match with the stored text data.

If the elimination criteria is passed, the method 300 proceeds to step 308 where the service provider server 102 calculates a base similarity score between the input text data and the stored text data based on the set of word pairs. As previously discussed, the scoring module 110 may also be configured to normalize the base score. At step 310, the service provider server 102 determines a scoring penalty based on the set of unpaired words. At step 312, the service provider server 102 generates a final similarity score between the input text data and the stored text data by modifying the based similarity score according to the scoring penalty. If the final similarity score satisfies a similarity score threshold, the service provider server 102 determines that the input text data matches the stored text data. Otherwise, the service provider server 102 determines that the input text data and the stored text data do not match.

Figure 4:
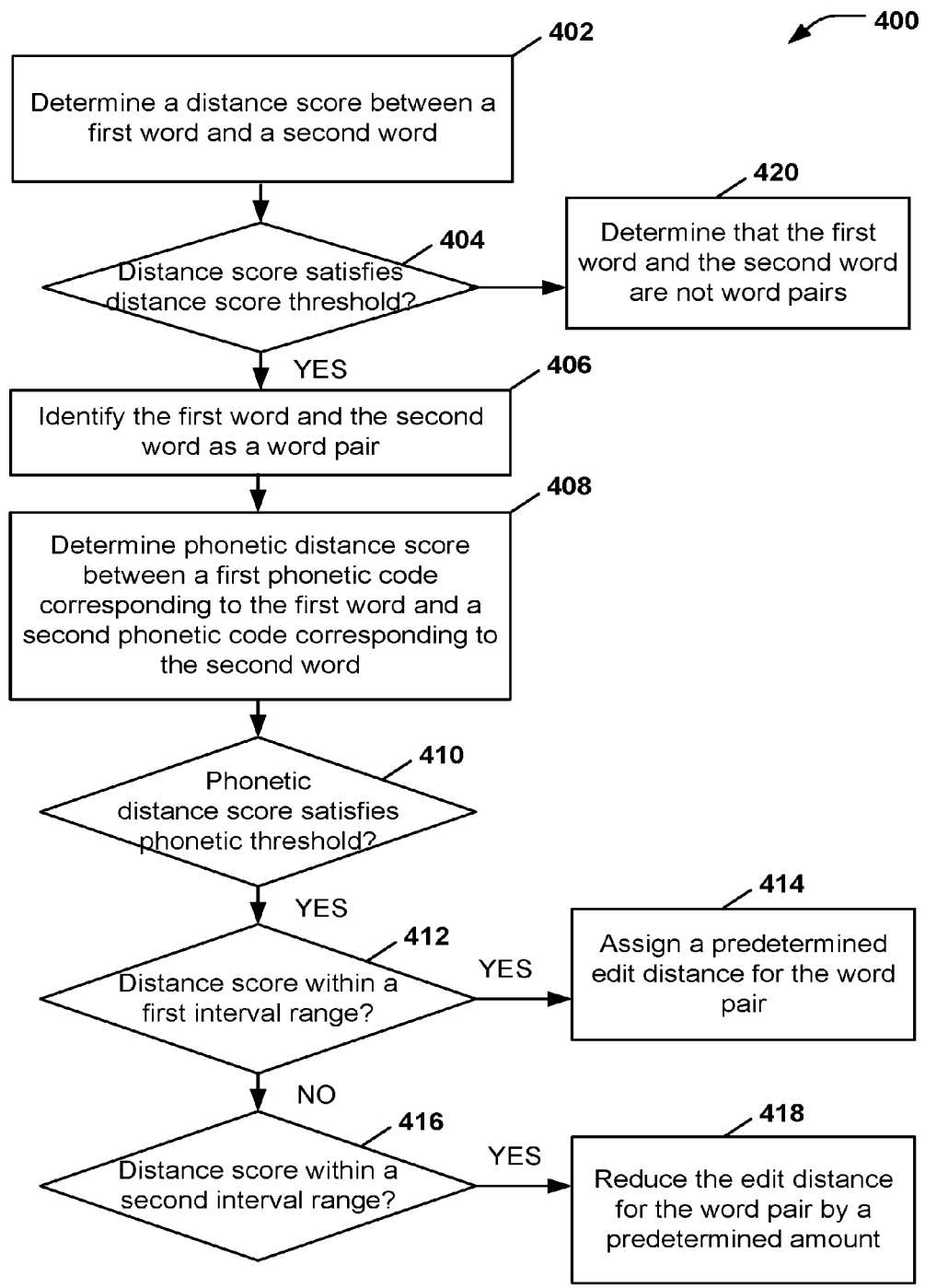
FIG. 4 is a flow diagram illustrating a method for identifying word pairs between a first set of words and a second set of words, according to some embodiments.

FIG. 4 illustrates an example flow diagram of a method 400 for identifying word pairs and determining respective distance scores for the word pairs, according to one or more particular embodiments. The method 400 may be performed within the context of the service provider server 102 identifying any word pairs between a first set of words and a second set of words. As previously discussed, the service provider server 102 performs pairing comparisons between each word from the first set of words with each word from the second set of words. To this end, the method 400 may be performed by the pairing module 106 for each pairing comparison.

The method begins at step 402, where a distance score is determined between a first word and a second word. The first word is included in the first set of words and the second word is included in the second set of words. The distance score is calculated using Equation 1 as previously discussed and is based on an edit distance between the first word and the second word.

At step 404, the pairing module 106 determines whether the distance score satisfies a distance score threshold. If so, the method 400 proceeds to step 406, where the pairing module 106 identifies the first word and the second word as a word pair. In some implementations, if the distance score fails to satisfy the distance score threshold, the pairing module 106 determines that the first word and the second word are not word pairs at step 420.

At step 408, the pairing module 106 determine a phonetic distance score between a first phonetic code corresponding to the first word and a second phonetic code corresponding to the second word. As previously discussed, the first phonetic code and the second phonetic code may be generated by the phonetic coding module 108 based on a phonetic coding algorithm such as Soundex. In certain implementations, the phonetic distance score is also calculated using the distance score equation of Equation 1. In other implementations, the phonetic distance is calculate using other statistical models.

At step 410, the pairing module 106 determines whether the phonetic distance score satisfies a phonetic distance threshold. In certain embodiments, the phonetic distance score and the phonetic distance threshold are numerical values from 0 to 100, with 100 indicating a perfect match and 0 indicating no match. If the phonetic distance score satisfies the phonetic distance threshold, the method 400 proceeds to step 412.

At step 412, the pairing module 106 determines whether the distance score (calculated at step 402) is within a first interval range. The first interval range may be a range of relatively high distance scores and may represent a high-quality match (in terms of distance scoring) between the first word and the second word. If the distance score is within the first interval range, at step 414, the pairing module 106 may assign a predetermined edit distance for the word pair. In other words, the pairing module 106 may assign the predetermined edit distance regardless of the previous edit distance that may have been calculated during the determination of the distance score for the first word and the second word in step 402.

At step 416, if the distance score is not within the first interval range, the pairing module 106 may determine whether the distance score is within the second interval range. In some embodiments, the second interval range may include a range of distance scores that are lower/less than the distance scores included in the first interval range. As such, the second interval range may represent a medium quality match between the first word and the second word in terms of their distance score. If the distance score is within the second interval range, at step 418, the pairing module 106 may reduce the edit distance by a predetermined amount. As such, the pairing module 106 may adjust the previous edit distance that may have been calculated during the determination of the distance score for the first word and the second word in step 402.

As a result of performing the method 400 between each word from the first set of words with each word from the second set of words, the pairing module 106 is able to determine the set of word pairs and respective distance scores between each word pair included in the set of word pairs. Further, the pairing module 106 is also able to determine the set of unpaired words.

Figure 5:
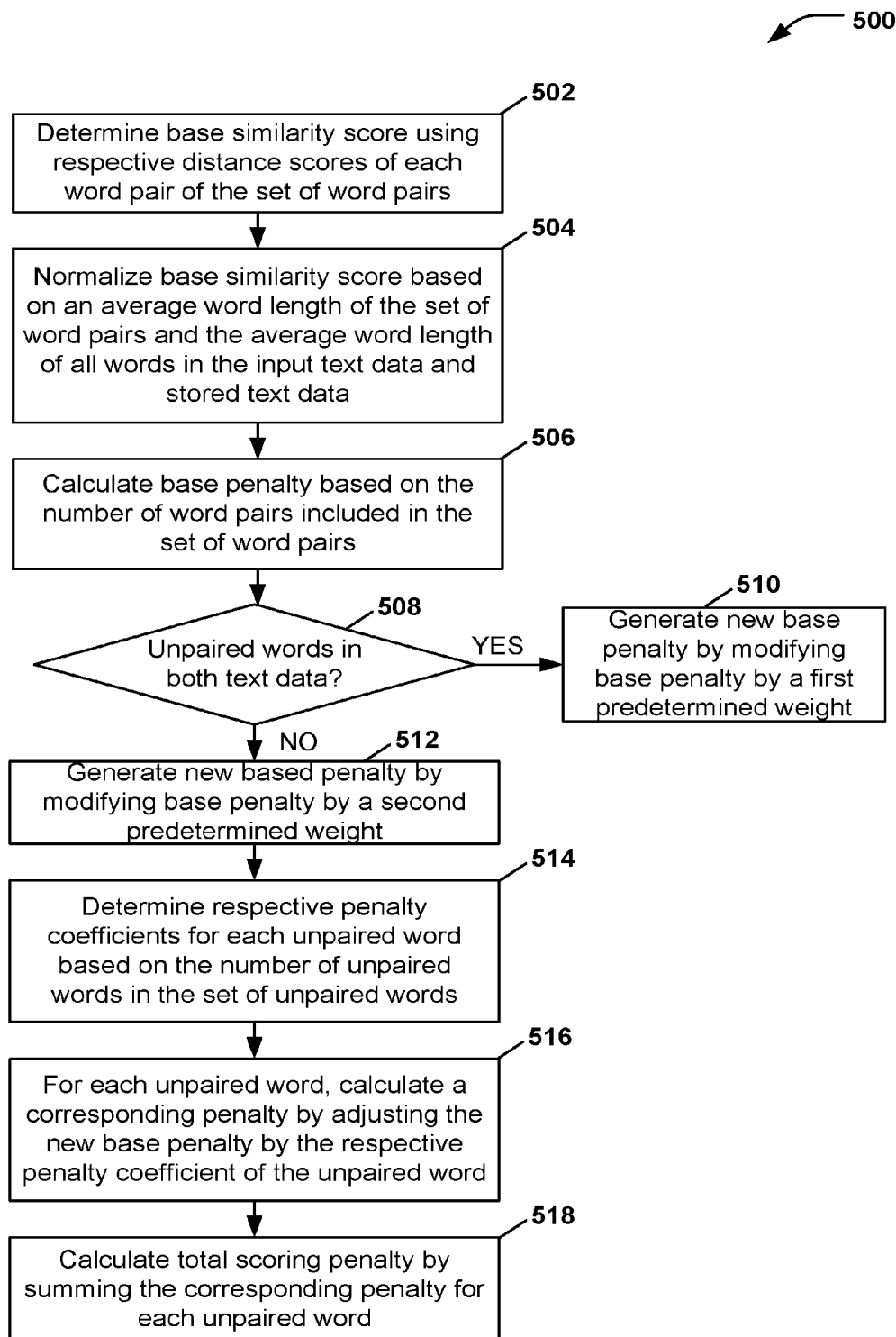
FIG. 5 illustrates a flow diagram illustrating a method for calculating a scoring penalty for the first set of words and the second set of words, according to some embodiments.

Referring now to FIG. 5 a flow diagram is depicted of a method 500 for determining penalties to apply to a similarity score between input text data and stored text data, according to an embodiment. The method 500 is performed in the context of the results of performing the method 400 for the input text data and the stored text data. The method 500 begins at step 502, where the scoring module 110 determines a base similarity score using the respective distance scores associated with each word pair of the set of word pairs. The respective distance score are the distance scores determined by the method 400 illustrated in FIG. 4.

At step 504, the scoring module 110 normalizes the base similarity score based on an average word length of the set of word pairs and the average word length of all words in the input text data and the stored text data. As previously discussed, the normalized based score may be calculated using Equation 2 and Equation 3. At step 506, the scoring module 110 may calculate the base penalty based on the number of word pairs included in the set of word pairs. The base penalty may be calculated based on Equation 4, described above.

At step 508, scoring module may determine whether the set of unpaired words includes words from both the input text data and the stored data. If so, the method 500 may proceed to step 510 where the scoring module 110 generates a new base penalty by modifying the base penalty with a first predetermined weight. If not, the method 500 may proceed to step 512, where the scoring module 110 generates a new base penalty by modifying the base penalty with a second predetermined weight. In some embodiments, the second predetermined weight may be greater than the second predetermined weight.

At step 514, the scoring module 110 may determine respective penalty coefficients for each unpaired word based on the number of unpaired words in the set of unpaired words. As previously discussed, the respective coefficient for each unpaired word may be different from each other and may increase as the number of unpaired words increases. At step 516, for each unpaired word, the scoring module 110 may calculate a corresponding penalty by adjusting the new base penalty by the respective penalty coefficient of the unpaired word.

At step 518, the scoring module 110 calculates a total scoring penalty by summing the corresponding penalty for each unpaired word. The scoring module 110 then generates the final similarity score between the input text data and the stored text data by subtracting the scoring penalty from the normalized base score.

Example Computing Device

Figure 6:
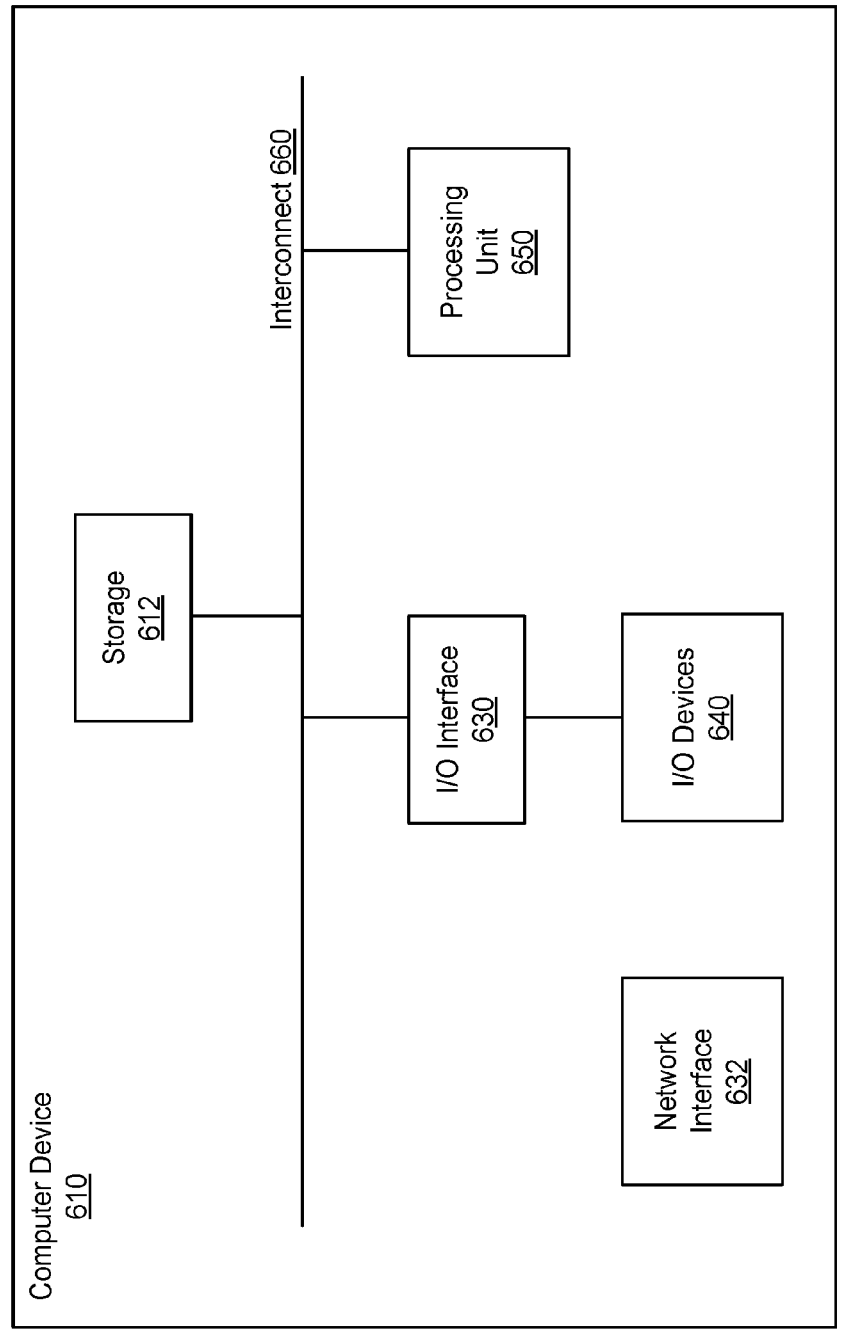
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including the components illustrated in FIG. 1. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system comprising:
one or more hardware processors; and
a memory storing computer-executable instructions, that in response to execution by the one or more hardware processors, causes the system to perform operations comprising:
receiving a request to determine a similarity score between an input set of words and a stored set of words;
determining a base similarity score using at least a distance score associated with pairs of words between the input set of words and the stored set of words;
normalizing the base similarity score determined using an average word length from the pairs between the input set of words and the stored set of words;
calculating a base penalty score on a number of word pairs included in the pairs between the input set of words and the stored set of words, wherein the base penalty score is further calculated using at least a difference between a normal base score and the base similarity score; and
determining a final similarity score based at least in part on the base penalty score calculated.

2. The system of claim 1, wherein the operations further comprise:
updating the base penalty score based at least on a predetermined weight, wherein the predetermined weight is greater than a first predetermined weight.

3. The system of claim 1, wherein the operations further comprise:
determining a total penalty score via a summation of base penalty scores for each of the pairs; and updating the base penalty score with the total penalty score.

4. The system of claim 1, wherein the operations further comprise:
   determining phonetic codes for each word in each of the input set of words and the stored set of words;
   identifying a set of unpaired words between the input set of words and the stored set of words using the phonetic codes and the distance scores determined; and
   adjusting the base similarity score based at least in part on the set of unpaired words identified.

5. The system of claim 4, wherein the normalizing includes using an average word length from the set of unpaired words.

6. The system of claim 1, wherein determining the final similarity score based in part on the base penalty score calculated includes reducing the base similarity score based at least on the base penalty score calculated.

7. The system of claim 1, wherein the determining the base similarity score is further based on an index file having a set of entity identifiers associated with past transactions processed by the entity identifiers.

8. A method comprising:
   receiving a request to determine a similarity score between an input set of words and a stored set of words;
   determining a base similarity score using at least a distance score associated with pairs of words between the input set of words and the stored set of words;
   determining phonetic codes for each word in each of the input set of words and the stored set of words;
   identifying a set of unpaired words between the input set of words and the stored set of words using the phonetic codes and the distance scores;
   adjusting the base similarity score based at least in part on the set of unpaired words identified;
   normalizing the adjusted base similarity score using an average word length from the pairs between the input set of words and the stored set of words;
   calculating a base penalty score on a number of word pairs included in the pairs between the input set of words and the stored set of words; and
   determining a final similarity score based at least in part on the base penalty score calculated.

9. The method of claim 8, wherein the base penalty score is determined using at least a difference between a normal base score and the base similarity score.

10. The method of claim 8, further comprising:
    updating the base penalty score based at least on a predetermined weight, wherein the predetermined weight is greater than a first predetermined weight.

11. The method of claim 8, further comprising:
    determining a total penalty score via a summation of base penalty scores for each of the pairs; and
    updating the base penalty score with the total penalty score.

12. The method of claim 8, wherein the normalizing includes using an average word length from the set of unpaired words.

13. The method of claim 8, wherein determining the final similarity score based at least in part on the base penalty score calculated includes reducing the base similarity score based on the base penalty score calculated.

14. The method of claim 8, wherein the determining the base similarity score is further based on a blacklist of entities associated with fraudulent transactions processed by the entities.

15. A non-transitory computer readable medium storing computer-executable instructions that in response to execution by one or more hardware processors, causes a payment provider system to perform operations comprising:
    receiving a request to determine a similarity score between an input set of words and a stored set of words;
    determining a base similarity score using at least a distance score associated with pairs of words between the input set of words and the stored set of words;
    normalizing the base similarity score determined using an average word length from the pairs between the input set of words and the stored set of words;
    calculating a base penalty score on a number of word pairs included in the pairs between the input set of words and the stored set of words, wherein the base penalty score is further calculated using at least a difference between a normal base score and the base similarity score; and
    determining a final similarity score based at least in part on the base penalty score calculated.

16. The non-transitory computer readable medium of claim 15, wherein the operations further comprise:
    updating the base penalty score based on a predetermined weight, wherein the predetermined weight is greater than a first predetermined weight.

17. The non-transitory computer readable medium of claim 15, wherein the operations further comprise:
    determining a total penalty score via a summation of base penalty scores for each of the pairs; and
    updating the base penalty score with the total penalty score.

18. The non-transitory computer readable medium of claim 15, wherein the operations further comprise:
    determining phonetic codes for each word in each of the input set of words and the stored set of words;
    identifying a set of unpaired words between the input set of words and the stored set of words using the phonetic codes and the distance scores determined; and
    adjusting the base similarity score based at least in part on the set of unpaired words identified.

19. The non-transitory computer readable medium of claim 18, wherein the normalizing includes using the average word length from the set of unpaired words.

20. The non-transitory computer readable medium of claim 15, wherein the determining the base similarity score is further based on an index file having a set of entity identifiers associated with past transactions processed by the entity identifiers.

* * * * *